United States Patent [19]
Kim

[11] Patent Number: 5,349,280
[45] Date of Patent: Sep. 20, 1994

[54] BATTERY PROTECTIVE CIRCUIT

[75] Inventor: Ik-Sun Kim, Suwon, Rep. of Korea

[73] Assignee: SamSung Electronics Co., Ltd., Suwon, Rep. of Korea

[21] Appl. No.: 940,971

[22] Filed: Sep. 3, 1992

[30] Foreign Application Priority Data

Sep. 18, 1991 [KR] Rep. of Korea ............... 91-15303

[51] Int. Cl.[5] .............................................. H02J 7/00
[52] U.S. Cl. ........................................ 320/13; 320/14
[58] Field of Search ..................... 320/13, 14, 31, 32, 320/39, 40

[56] References Cited

U.S. PATENT DOCUMENTS

| | | | |
|---|---|---|---|
| 4,291,266 | 9/1981 | Portmann | 320/40 X |
| 4,342,953 | 8/1982 | Collins | 320/13 |
| 4,354,118 | 10/1982 | Spencer | 320/13 X |
| 4,571,531 | 2/1986 | Lin | 320/14 X |
| 4,622,508 | 11/1986 | Matteau et al. | 320/13 |
| 4,704,542 | 11/1987 | Hwang | 320/13 X |
| 4,963,811 | 10/1990 | Weber | 320/14 X |
| 5,073,837 | 12/1991 | Baek | 320/13 X |
| 5,177,426 | 1/1993 | Nakanishi et al. | 320/13 |

Primary Examiner—Kristine L. Peckman
Attorney, Agent, or Firm—Robert E. Bushnell

[57] ABSTRACT

A battery protective circuit for a portable cassette recorder equipping both battery and re-charger for preventing power consumption generated by the re-charger being charged by battery power when battery voltage is higher than re-charger voltage;

when the power is supplied to a terminal of an instrument main frame by battery power, the circuit can prevent the charging by the battery to the re-charger by way of cutting off the connection between re-charger and battery. The circuit can also prevent unnecessary consumption of battery by causing the charge of re-charger to be possible only when an adapter which supplies power from separate power source is connected;

the battery protective circuit in accordance with the present invention can obtain the effect of preventing unnecessary battery consumption and of lengthening the life span of battery by avoiding charging the re-charger through the battery.

17 Claims, 1 Drawing Sheet

BATTERY PROTECTIVE CIRCUIT

BACKGROUND OF THE INVENTION

1. Field of the Invention

The present invention relates to a battery protective circuit of portable cassette recorder (or radio), and more particularly to a battery protective circuit, being utilized in the portable cassette recorder equipping both battery and re-charger, which can prevent unnecessary consumption of battery power generated by re-charger being charged by the battery power when the voltage of battery is higher than that of a re-charger.

2. Description of the Prior Art

Generally, the portable cassette recorder utilizing re-charger is provided with a separate battery pack in which conventional batteries are inserted, and a re-charger is mounted to the inside of cassette recorder for use.

Furthermore, when there is a separate power source, said power source can be utilized by using an adapter, and when adapter is used, the battery and re-charger are designed to be separated by circuit, so that re-charger can be charged.

Meanwhile there are several kinds of re-chargers such as sulfer/natrium battery, Nicad battery and the like, and every re-charger has a larger capacity than the battery and can obtain the desired level of voltage and current only when re-charged more than predetermined period of time.

Specifically, when the power of conventional battery somehow flows into said re-charger by unknown reason, only quite small amount of power is charged with said re-charger if compared with the amount of power consumed in the battery.

In the meantime, as conventional portable cassette recorder has a construction having a re-charger and a battery wired on the same power line, and when the voltage of a re-charger is lower than that of a battery, current flows from the battery to the re-charger.

At this point, the battery consumes power unnecessarily due to said characteristics of a re-charger.

In this manner, due to unnecessary power consumption of a battery in the conventional power circuit, one disadvantage is that the life span of a battery becomes shortened, and more specifically, in the case of portable cassette recorder using small capacity of batteries, there has been a disadvantage of shortened time in the use of batteries.

SUMMARY OF THE INVENTION

Accordingly, it is the object of the present invention to provide an improved battery protective circuit. It is another object to provide a battery protective circuit, which can prevent unnecessary power consumption from the battery by cutting off the connection between the re-charger and battery, thus enabling the charge of a re-charger to be possible only when an adapter supplying separate power source to the external is attached, in the case of a main source terminal for instrument main frame being supplied with power.

In accordance with the object of the present invention, the battery protective circuit is provided with various means, comprising:

adapter coupling means for supplying external power to main power terminal by disconnecting the battery power being applied to main power terminal after current is stabilized at constant-current control means during separate power being supplied from the external;

comparison means for comparing the battery supply voltage or the external supply voltage outputted from said adapter coupling means with re-charger voltage;

first switching means for interdicting the current of battery supplied to the re-charger when power is supplied to the battery and for charging by connecting the external power to the re-charger when the voltage of re-charger is considered to be lower than power voltage of battery or the external at said comparison means; and second switching means for supplying the power of re-charger to main power terminal when the voltage of re-charger is considered to be higher than the power voltage of battery or of the external.

BRIEF DESCRIPTION OF THE DRAWINGS

For fuller understanding of the nature and objects of the invention, reference should be made to the following detailed description taken in conjunction with the accompanying drawing in which.

DETAILED DESCRIPTION OF THE INVENTION

Figure 1:
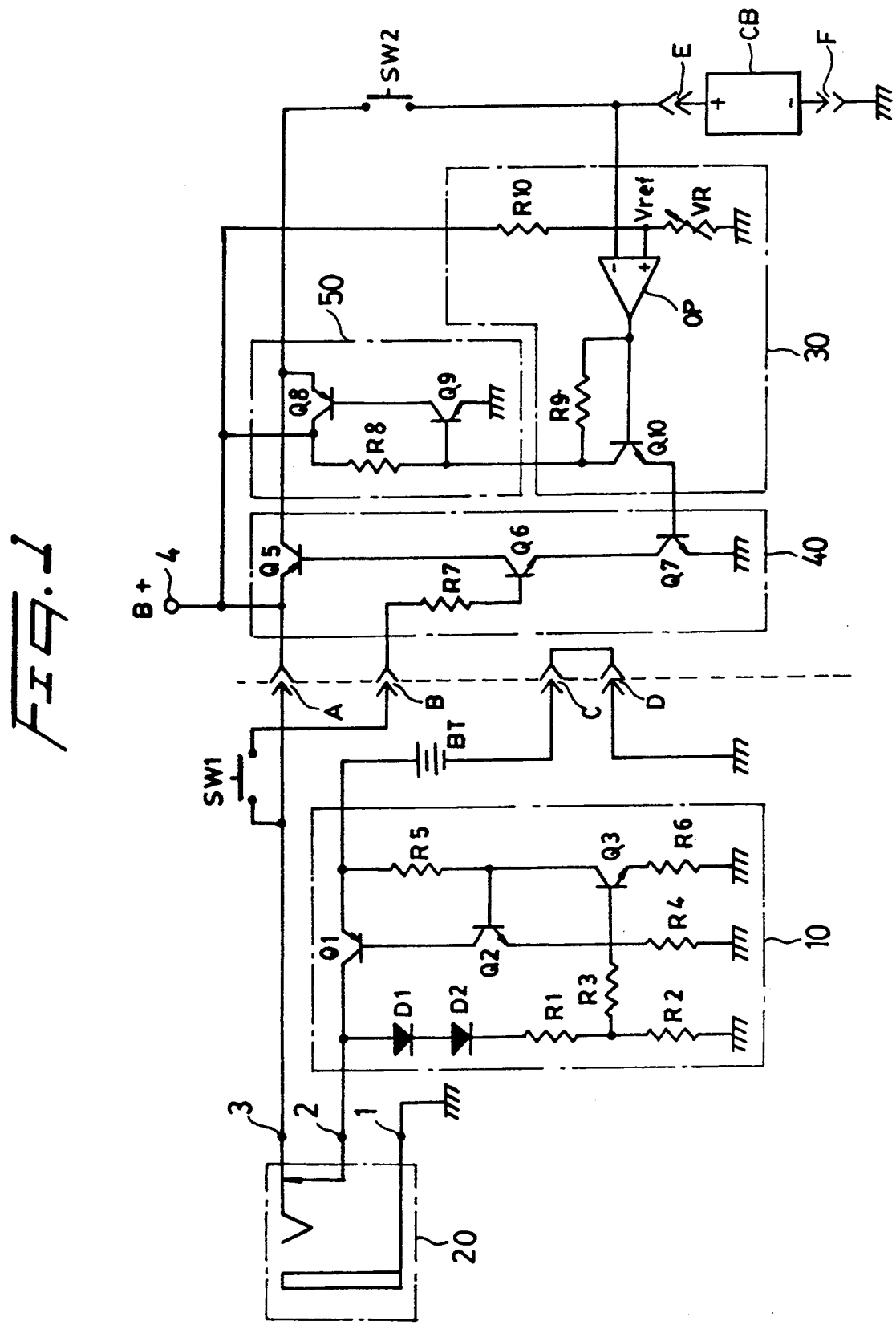
FIG. 1 shows a drawing of battery protective circuit in accordance with the present invention.

According to FIG. 1, the portable cassette recorder is designed to couple with or separate from main frame by contact-type coupling means A, B, C, D, being equipped with separate battery pack, the purpose of which is to make carrying-along handy by, if necessary, minimizing the size of an instrument and separating the battery pack during handcarry, and to lengthen the usage time of instrument as long as possible by using battery pack.

In this manner, the battery pack separable from instrument main frame can be distinguished largely into conventional battery BT, constant-current control means 10, and adapter coupling means 20, while power circuit of instrument main frame can be distinguished into a re-charger CB, which can be coupled with or separated from instrument main frame by contact-type coupling means E,F, comparison means 30, and first and second switching means 40, 50.

In the above construction, constant-current control means 10 of battery pack supplies to the main power terminal 4 of main frame by making the current outputted from the battery, BT steady.

In other words, when the battery pack is connected to the instrument main frame, instrument main frame and battery pack are electrically connected by contact-type coupling means A, B, C, D, and the battery power is supplied to constant-current control means 10 by contact-type coupling means C, D.

When constant-current control means 10 is supplied by the battery power, transistors, Q2 and Q1 are caused to turn on.

When the transistor Q1 is turned on, the battery power BT is supplied to main power terminal 4 of the instrument main frame through a transistor Q1, terminals 2, 3 of adapter coupling means 20 and contact-type coupling means A.

Furthermore, the battery power BT supplied to main power terminal 4 of instrument main frame is supplied to the base of a transistor Q3 through diodes D1, D2.

Therefore, the transistor Q3 is turned on for control of bias voltage of the transistor Q2, and the transistor Q2 turned on by controlled bias voltage controls bias voltage of transistor Q1 to control the current of battery supplied to a terminal 2 of adapter coupling means 20.

In this manner, constant-current control means 10 controls the current of battery BT for outputting to main power terminal 4 of instrument main frame.

At this point, as adapter jack recognition means SW1 is in "off"(or "open") status, the transistors Q5, Q6 also become off, causing the power of battery Bt to be separated from re-charger CB.

Accordingly, though the voltage of re-charger CB is lower than that of battery BT, the re-charger CB is not charged by the battery BT.

Meanwhile, when the user inserts power supply jack to adapter coupling means 20 for using separate external power other than re-charger CB and battery BT, the contact between terminals 2, 3 becomes open, external power terminal is caused to contact terminals 1, 3, resulting in the external power being supplied to main power terminal 4 of instrument main frame.

Furthermore, the external power applied to main power terminal 4 of instrument main frame is supplied to comparison means 30 and reference voltage Vref is established by a resistor R10 of comparison means 30 and a variable resistor VR for being inputted to non-inversion input (+) of a comparator OP.

The comparator OP compares said reference voltage Vref with that of re-charger CB inputted to non-inversion input (−).

When comparative result shows that the voltage of re-charger CB is bigger than that of reference voltage Vref, the comparator OP outputs low level of signals, causing a transistor Q10 to be off.

When the transistor Q10 of comparison means 30 becomes off, the transistor Q7 of first switching means 40 also becomes off, resulting in the transistor Q5 to be off too.

Therefore, the external power is separated from the re-charger CB, so re-charger CB does not charge.

However, when the voltage of re-charger CB is lower than reference voltage Vref, the comparator OP outputs high level of signals, causing the transistor Q10 to be on.

When the transistor Q10 of comparison means 30 becomes on, the transistor Q7 of first switching means 40 also becomes on.

At this moment, as adapter jack recognition means SW1 is in "ON" state (or "CLOSED" state) by external power jack, the transistor Q6 of first switching means 40 becomes "ON".

Accordingly, the transistor Q5 of first switching means 40 becomes "ON", and the external power inputted through adapter coupling means 20 supplies power to main power terminal 4 of instrument main frame and simultaneously is supplied to re-charger recognition means SW2 through the transistor Q5 of first switching means 40.

As said re-charger recognition means SW2 becomes "ON" under the condition of re-charger CB being mounted, the re-charger CB is charged by the external power supplied through re-charger recognition means SW2 and contact-type coupling means E.

If the re-charger CB is not mounted, re-charger recognition means SW2 becomes "OFF", which does not cause contact-type coupling means E for mounting re-charger CB to be supplied by the power.

Meanwhile, comparison means 30 of instrument main frame receives the power from the battery BT of battery pack or adapter coupling means 20, and reference voltage Vref of comparison means 30, which is inputted to non-inversion input (+) of comparator OP. The comparator OP compares said reference voltage Vref with the voltage of re-charger CB inputted to inversion input (−).

When comparison result shows that the voltage of re-charger CB is higher than reference voltage Vref, the comparator OP outputs signals of low level while the transistor Q10 becomes "OFF".

When the transistor Q10 of comparative means 30 becomes "OFF", the transistor Q9 of second switching means 50 becomes "ON", thereby causing the transistor Q8 to become "ON".

In this manner, in the battery protective circuit in accordance with the present invention, when supplying power by way of the battery, the connection between the battery and re-charger is completely cut off, resulting in no-charge of re-charger by the battery.

Accordingly, the battery protective circuit in accordance with the present invention prevents the charge of re-charger by the battery and unnecessary consumption of batteries, resulting in the effect of lengthening the life span of batteries.

What is claimed is:

1. A battery protective circuit, comprising:
   comparison means for comparing a voltage of a re-charger with a second voltage provided by one of a battery supply voltage and an external supply voltage supplied to a main power terminal from adapter coupling means;
   first switching means for cutting off battery current being applied to the re-charger when current is supplied by a battery, said re-charger being charged by connecting an external source of power to the re-charger when said comparison means determines that the re-charger voltage is lower than said second voltage; and
   second switching means for causing power provided by the re-charger to be applied to the main power terminal when said comparison means determines that the re-charger voltage is higher than said second voltage.

2. The battery protective circuit as defined in claim 1, wherein said first switching means comprises:
   a first transistor having a control electrode connected to a first output of said comparison means, said control electrode of said first transistor enabling said first transistor to be electrically conductive when the voltage of the re-charger is determined by the comparison means to be lower than the second voltage;
   a second transistor having a control electrode connectible to adapter jack recognition means, said control electrode of said second transistor enabling said second transistor to be electrically conductive during supply of power from said external supply voltage; and
   a third transistor providing an electron path between the external source of power and the re-charger, said third transistor being electrically conductive when the voltage provided by the re-charger is lower than the external supply voltage.

3. The battery protective circuit as defined in claim 2, wherein said second switching means comprises:

a fourth transistor having a control electrode connected to a second output of said comparison means, said control electrode of said fourth transistor enabling said fourth transistor to be electrically conductive when the re-charger voltage is considered by the comparison means to be higher than the second voltage; and a fifth transistor providing an electron path between the re-charger and the main power terminal, said fifth transistor being electrically conductive when the re-charger voltage is higher than the second voltage.

4. The battery protective circuit as defined in claim 1, further comprised of said first switching means comprising:

a first transistor having a control electrode connected to a first output of said comparison means, said control electrode of said first transistor enabling said first transistor to be electrically conductive when the voltage of the re-charger is considered by said comparison means to be lower than the battery supply voltage;

a second transistor having a control electrode connectible to adapter jack recognition means, said control electrode of said second transistor enabling said second transistor to be electrically conductive during supply of the external supply voltage; and a third transistor providing an electron path between the external supply voltage and the re-charger, said third transistor being electrically conductive when the voltage of the re-charger is lower than the external supply voltage.

5. The battery protective circuit as defined in claim 4, further comprised of said second switching means comprising:

a fourth transistor having a control electrode connected to a second output of said comparison means, said control electrode of said fourth transistor enabling said fourth transistor to be electrically conductive when said voltage of the re-charger is considered by the comparison means to be higher than the battery supply voltage; and a fifth transistor providing an electron path between the re-charger and the main power terminal, said fifth transistor being electrically conductive when said voltage of the re-charger is higher than the battery supply voltage.

6. The battery protective circuit as defined in claim 1, further comprised of said first switching means comprising:

a first transistor having a control electrode connected to a first output of said comparison means, said control electrode of said first transistor enabling said first transistor to be electrically conductive when the voltage of the re-charger is considered by said comparison means to be lower than the external supply voltage;

a second transistor having a control electrode connectible to adapter jack recognition means, said control electrode of said second transistor enabling said second transistor to be electrically conductive during supply of the external supply voltage; and a third transistor providing an electron path between the external supply voltage and the re-charger, said third transistor being electrically conductive when the re-charger voltage is lower than the external supply voltage.

7. The battery protective circuit as defined in claim 6, further comprising said second switching means comprising:

a fourth transistor having a control electrode connected to a second output of said comparison means, said control electrode of said fourth transistor enabling said fourth transistor to be electrically conductive when the re-charger voltage is considered by said comparison means to be higher than the external supply voltage; and a fifth transistor providing an electron path between the re-charger and the main power terminal, said fifth transistor being electrically conductive when said voltage of the re-charger is higher than the external supply voltage.

8. The battery protective circuit as defined in claim 1, further comprised of said second voltage being said battery supply voltage.

9. The battery protective circuit as defined in claim 1, further comprised of said second voltage being said external supply voltage.

10. A battery protective circuit, comprising:

comparison means for comparing a voltage of a re-charger with a battery supply voltage supplied to a main power terminal from a coupling;

first switching means for cutting off a battery current being applied to the re-charger when the battery current is supplied by a battery, said re-charger being charged by connecting an external supply voltage to the re-charger when said comparison means determines that the recharger voltage is lower than the battery supply voltage; and second switching means for causing said voltage of the re-charger to be applied to the main power terminal when said comparison means determines that the voltage of the re-charger is higher than the battery supply voltage.

11. The battery protective circuit as defined in claim 10, further comprised of said first switching means comprising:

a first transistor having a control electrode connected to a first output of said comparison means, said control electrode of said first transistor enabling said first transistor to be electrically conductive when the voltage of the re-charger is considered by said comparison means to be lower than the battery supply voltage;

a second transistor having a control electrode connectible to adapter jack recognition means, said control electrode of said second transistor enabling said second transistor to be electrically conductive during supply of the external supply voltage; and a third transistor providing an electron path between the external supply voltage and the re-charger, said third transistor being electrically conductive when the voltage of the re-charger is lower than the external supply voltage.

12. The battery protective circuit as defined in claim 11; further comprised of said second switching means comprising:

a fourth transistor having a control electrode connected to a second output of said comparison means, said control electrode of said fourth transistor enabling said fourth transistor to be electrically conductive when said voltage of the re-charger is considered by the comparison means to be higher than the battery supply voltage; and a fifth transistor providing an electron path between the re-charger and the main power terminal, said fifth transistor being electrically conductive when said voltage of the re-charger is higher than the battery supply voltage.

13. A battery protective circuit, comprising:

comparison means for comparing a voltage of a re-charger with an external supply voltage supplied to a main power terminal from a coupling;

first switching means for cutting off a battery current being applied to the re-charger when the battery current is supplied by a battery, said re-charger being charged by connecting the external supply voltage to the re-charger when said comparison means determines that said voltage of the re-charger is lower than the external supply voltage; and second switching means for causing said voltage of the re-charger to be applied to the main power terminal when said comparison means determines that said voltage of the re-charger is higher than the external supply voltage.

14. The battery protective circuit as defined in claim 13, further comprised of said first switching means comprising:

a first transistor having a control electrode connected to a first output of said comparison means, said control electrode of said first transistor enabling said first transistor to be electrically conductive when the voltage of the re-charger is considered by said comparison means to be lower than the external supply voltage;

a second transistor having a control electrode connectible to adapter jack recognition means, said control electrode of said second transistor enabling said second transistor to be electrically conductive during supply the external supply voltage; and a third transistor providing an electron path between the external supply voltage and the re-charger, said third transistor being electrically conductive when the re-charger voltage is lower than the external supply voltage.

15. The battery protective circuit as defined in claim 14 further comprising said second switching means comprising:

a fourth transistor having a control electrode connected to a second output of said comparison means, said control electrode of said fourth transistor enabling said fourth transistor to be electrically conductive when the re-charger voltage is considered by said comparison means to be higher than the external supply voltage; and a fifth transistor providing an electron path between the re-charger and the main power terminal, said fifth transistor being electrically conductive when said voltage of the re-charger is higher than the external supply voltage.

16. A process for protecting a battery, comprising:

comparing a voltage of a re-charger with an external supply voltage supplied to a main power terminal;

interrupting a battery current being applied to the re-charger when the battery current is supplied by the battery, said re-charger being charged by connecting the external supply voltage to the re-charger when comparison means determines that said voltage of the re-charger is lower than the external supply voltage; and causing said voltage of the re-charger to be applied to the main power terminal when said comparison means determines that said voltage of the re-charger is higher than the external supply voltage.

17. The process defined by claim 16, the step of interrupting said battery current further comprising:

electrically transmitting from a first output of said comparison means to a control electrode of a first transistor when the voltage of the re-charger is lower than the external power supply voltage;

electrically transmitting from adapter jack recognition means to a control electrode of a second transistor during supply of the external supply voltage; and electrically connecting the external supply voltage to the re-charger via a third transistor when the re-charger voltage is lower than the external supply voltage.

* * * * *